(12) United States Patent
Serbest et al.

(10) Patent No.: US 7,813,345 B2
(45) Date of Patent: Oct. 12, 2010

(54) MAC LEARNING USING VC-LSP DEDICATED FOR BROADCAST AND UNKNOWN FRAMES

(75) Inventors: Yetfk Serbest, Austin, TX (US); Eric Peter Puetz, Georgetown, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1201 days.

(21) Appl. No.: 10/455,745

(22) Filed: Jun. 5, 2003

(65) Prior Publication Data

US 2004/0258069 A1    Dec. 23, 2004

(51) Int. Cl.
H04L 12/56 (2006.01)
H04L 12/28 (2006.01)

(52) U.S. Cl. ............ 370/390; 370/409; 370/395.5; 370/395.53

(58) Field of Classification Search ............ 370/395.5, 370/395.1, 389, 395.53, 390, 409
See application file for complete search history.

(56) References Cited

U.S. PATENT DOCUMENTS

| | | | |
|---|---|---|---|
| 6,205,488 B1 | 3/2001 | Casey et al. | |
| 6,336,129 B1 | 1/2002 | Ise et al. | |
| 6,363,053 B1 | 3/2002 | Schuster et al. | |
| 6,374,303 B1 | 4/2002 | Armitage et al. | |
| 6,430,155 B1 | 8/2002 | Davie et al. | |
| 6,469,983 B2 | 10/2002 | Narayana et al. | |
| 6,477,166 B1 | 11/2002 | Sanzi et al. | |
| 6,501,754 B1 | 12/2002 | Ohba et al. | |
| 6,501,756 B1 | 12/2002 | Katsube et al. | |
| 6,519,062 B1 | 2/2003 | Yoo | |
| 6,611,525 B1 * | 8/2003 | Natanson et al. | 370/395.53 |
| 7,006,499 B2 * | 2/2006 | Tingle et al. | 370/392 |
| 7,260,097 B2 * | 8/2007 | Casey | 370/392 |
| 7,269,132 B1 * | 9/2007 | Casey et al. | 370/219 |
| 7,283,465 B2 * | 10/2007 | Zelig et al. | 370/219 |
| 7,339,929 B2 * | 3/2008 | Zelig et al. | 370/390 |
| 7,447,212 B2 * | 11/2008 | Hu | 370/395.3 |
| 7,463,639 B1 * | 12/2008 | Rekhter | 370/409 |
| 7,519,056 B2 * | 4/2009 | Ishwar et al. | 370/389 |
| 7,558,194 B2 * | 7/2009 | Regan et al. | 370/217 |
| 7,570,648 B2 * | 8/2009 | Hu et al. | 370/396 |
| 7,643,424 B2 * | 1/2010 | Liu et al. | 370/236.2 |
| 2002/0083174 A1 | 6/2002 | Hayashi et al. | |
| 2002/0101868 A1 | 8/2002 | Clear et al. | |
| 2002/0105922 A1 | 8/2002 | Jabbari et al. | |
| 2003/0110268 A1 * | 6/2003 | Kermarec et al. | 709/227 |
| 2003/0142674 A1 * | 7/2003 | Casey | 370/393 |

(Continued)

OTHER PUBLICATIONS

Agilent Technologies, "Testing Edge Services: VPLS over MPLS", Feb. 3, 2003, Agilent Technologies, Inc.*

(Continued)

*Primary Examiner*—Kent Chang
*Assistant Examiner*—Allahyar Kasraian
(74) *Attorney, Agent, or Firm*—Toler Law Group

(57) ABSTRACT

A telecommunication system comprises a first plurality of virtual circuit label switched paths (VC-LSPs) dedicated to communicate broadcast and unknown frames. The known frames have an encapsulated source site identifier used for media access control (MAC) address learning.

18 Claims, 4 Drawing Sheets

U.S. PATENT DOCUMENTS

| | | | |
|---|---|---|---|
| 2003/0174706 A1* | 9/2003 | Shankar et al. | 370/393 |
| 2003/0174715 A1* | 9/2003 | Yazaki | 370/397 |
| 2004/0151180 A1* | 8/2004 | Hu et al. | 370/392 |
| 2004/0174887 A1* | 9/2004 | Lee | 370/395.53 |
| 2004/0184407 A1* | 9/2004 | Pok et al. | 370/236 |
| 2004/0184408 A1* | 9/2004 | Liu et al. | 370/236 |
| 2005/0169270 A1* | 8/2005 | Mutou et al. | 370/390 |
| 2007/0008982 A1* | 1/2007 | Voit et al. | 370/401 |
| 2007/0076709 A1* | 4/2007 | Mattson et al. | 370/389 |
| 2007/0121615 A1* | 5/2007 | Weill et al. | 370/389 |

OTHER PUBLICATIONS

Lasserre et al. "Virtual Parivate LAN Services over MPLS / darft-lasserre-vkompella-ppvpn-vpls-01.txt", Mar. 2002, Internet Engineering Tast Force (IETF), 01.*

Khandekar et al. "Hierarchial Virtual Private LAN Service / draft-khandekar-ppvpn-mpls-00.txt", Nov. 2001, Internet Engineering Tast Force (IETF), 00.*

Martini et al. "Encapsulation Methods for Transport of Layer 2 Frames Over MPLS / darft-martini-l2circuit-encap-mpls-00.txt", Nov. 2000, Internet Engineering Tast Force (IETF), 00.*

* cited by examiner

MAC LEARNING USING VC-LSP DEDICATED FOR BROADCAST AND UNKNOWN FRAMES

BACKGROUND OF THE INVENTION

1. Field of the Invention

The present invention relates to virtual private networks.

2. Description of the Related Art

Various transport and packet-based telecommunication services are provided to interconnect two or more customer locations. Two services provided by SBC Communications are branded as GigaMAN™ and Native LAN Plus™.

The GigaMAN™ service provides point-to-point 1.25 Gbps Ethernet service over dedicated fiber facilities. The GigaMAN™ service is a local-area network (LAN)/wide-area network (WAN) extension of a customer's CPE switches. Presently, the GigaMAN™ service does not offer multi-point to multi-point service.

The Native LAN Plus™ service provides point-to-point and multi-point-to-multi-point service supporting 10/100 Mb Ethernet, 4/16 Mb Token Ring, and Fiber Distributed Data Interface (FDDI). The service is based on existing ATM infrastructure using IP over ATM and RFC 1483/2684 Bridging Mode. Being ATM-based, this service is QoS capable. This service also has good operations and maintenance (OAM) capabilities (e.g. well-defined ATM OAM functionalities), and supports multiple LAN technologies. Presently, this service is neither scaleable (by requiring a large number of permanent virtual circuits), nor flexible (e.g. by requiring upgrades to the network to increase a customer access speed). For example, Gigabit Ethernet speeds are not presently supported, but can be supported by upgrading from an OC3c to an OC48c up-link into the network. A transparent LAN service (TLS), also known as a virtual private LAN service (VPLS), is designed to replace and address issues in the Native LAN Plus™ service.

In metropolitan area networks (MANs), Ethernet is a promising technology to increase the capacity in a scaleable and flexible manner. Providing Internet access and transparent LAN services over Ethernet platforms has several advantages. Starting from 10 Mbps speed, Ethernet can support 100 Mbps and 1000 Mbps, and soon will reach 10 Gbps. With Ethernet, like other layer 2 services, the carrier is responsible for layer 2 connectivity and does not participate in layer 3 routing. Thus, the carrier avoids the complexities of peering at layer 3 with its customers.

The simplicity of Ethernet, compared to ATM and SONET, results in challenges to be addressed in order to provide carrier class transparent LAN and dedicated Internet access services. In particular, any platform that is to be widely deployed in carrier networks should address network management and performance guarantees. By not guaranteeing a committed end-to-end rate, Ethernet currently is inferior to SONET and ATM on providing Quality of Service (QoS). Further, Ethernet does not have fast recovery mechanisms to redirect traffic around faults, which is disadvantageous when attempting to deploy high-premium, mission-critical services. In addition, Ethernet does not have built-in monitoring and troubleshooting capabilities. In a sense, the complexity is moved to network management, monitoring, and capacity planning phases.

To overcome the aforementioned issues, Ethernet platforms are implementing Ethernet over Multi-Protocol Label Switching (EoMPLS). EoMPLS employs a combination of Resource Reservation Protocol with Traffic Engineering (RSVP-TE) extensions and Open Shortest Path First with Traffic Engineering (OSPF-TE) extensions, Connection Admission Control (CAC), and constraint-based routing algorithms to address the aforementioned issues.

FIG. 1 is a block diagram of an Ethernet Optical Network (EON). The metro EON comprises Ethernet switches connected by fiber links. The fiber links can be either 10 Gigabit Ethernet links or wave-division multiplexed (WDM) links. The edge of the service provider networks extends to the customer premises and terminates at switch network elements owned by the service provider.

As defined by the Internet Engineering Task Force (IETF), a VPN or a closed user group has the following network elements: (i) customer edge (CE) devices such as a Multi-Tenant Units (MTUs) 20 associated with the access layer to the network; (ii) provider edge (PE) devices 22 associated with the aggregation layer of the network; and (iii) provider core (P) devices 24 associated with the core layer of the service provider network. The MTU devices 20 reside in the customer premises but is owned by the service provider. The PE devices 22 are at the edge of the service provider network and placed in a service provider's central office locations. The PE devices 22 possess a significant feature set to support its many tasks. The core MPLS tunnels start and end at the PE switches 22. Further, an existing Frame Relay/ATM network is connected to the EON at the PE-level. The P devices 24 are high-speed MPLS label swapping devices that reside in the service provider's central office locations.

Typically, a number of access/edge network elements have point-to-point (PTP) Gigabit Ethernet links, optionally with protection including diverse routing, to an aggregation network element located at a central office. The access/edge network elements connect to customer CPEs (e.g. routers) via Ethernet or Gigabit Ethernet links.

The aggregation network elements are interconnected to core network elements in a mesh with PTP fiber Gigabit Ethernet links within the central office. PTP links can be provided over a ring topology where appropriate. Also, where appropriate, WDM links can be used to interconnect the core network elements between central offices. Multiple central offices may reside in a Local Access and Transport Area (LATA). The Ethernet-based services are currently offered within a LATA.

Typically, a handoff to an Internet Service Provider (ISP) or multiple ISPs 30 occurs at the core network element. This provides access to the global Internet 32. Other core network elements can couple the network to an ATM/Frame Relay (FR) backbone 34 or an IP-VPN backbone 36. The network in combination with the backbone 36 can provide a VPN for sites 40 of a corporation C. The network in combination with the backbone 34 can provide a VPN for sites 42 of a corporation D. Sites 44 and 46 for corporations A and B are also served.

The telecommunication industry is attempting to make MPLS robust and scaleable. IETF draft documents (herein referred to as "Martini specifications") define PTP transport using Label Distribution Protocol (LDP), and encapsulations for multiple layer 2 services such as FR and ATM. Label stacking is used to improve the scaleability of the network. A tunnel label determines the path to the remote edge, and a Virtual Circuit (VC) label designates the tunnel end point.

Other IETF draft documents detail multi-point-to-multi-point extensions based on Hierarchical VPLS (HVPLS), Decoupled Transparent LAN Service (DTLS), and Logical Provider Edge (LPE). HVPLS uses LDP to signal the VPLS or TLS. However, an administrator is required to configure the membership explicitly because the LDP does not have a VPN discovery function. In contrast, both DTLS and LPE define a mechanism for automatic VPN discovery in Multi-Protocol Border Gateway Protocol (MP-BGP).

In HVPLS, a single Virtual Circuit Label-Switched Path (VC-LSP) exists between the MTU edge switch and the PE switch per each closed user group. Both the MTU and the PE perform MAC learning, however only the PE does replication for unknown and broadcast frames. PEs are fully meshed by VC-LSPs for each closed user group. VC-LSPs in HVPLS use Martini specifications.

In DTLS, MTUs are fully meshed by VC-LSPs per each closed user group. The MTU performs both MAC learning and replication for unknown and broadcast frames. PEs are responsible for closed user group discovery and MPLS label distribution. VC-LSPs in DTLS use Martini specifications.

In LPE, a single VC-LSP exists between the MTU edge switch and the PE switch per each closed user group. The MTU performs MAC learning, and the PE does replication for unknown and broadcast frames. PEs are fully meshed by VC-LSPs for each closed user group. VC-LSPs in LPE use proprietary encapsulation to perform replication whenever necessary to optimize replication functionality.

BRIEF DESCRIPTION OF THE DRAWINGS

The present invention is pointed out with particularity in the appended claims. However, other features are described in the following detailed description in conjunction with the accompanying drawing in which:

DETAILED DESCRIPTION OF THE PREFERRED EMBODIMENTS

Figure 1:
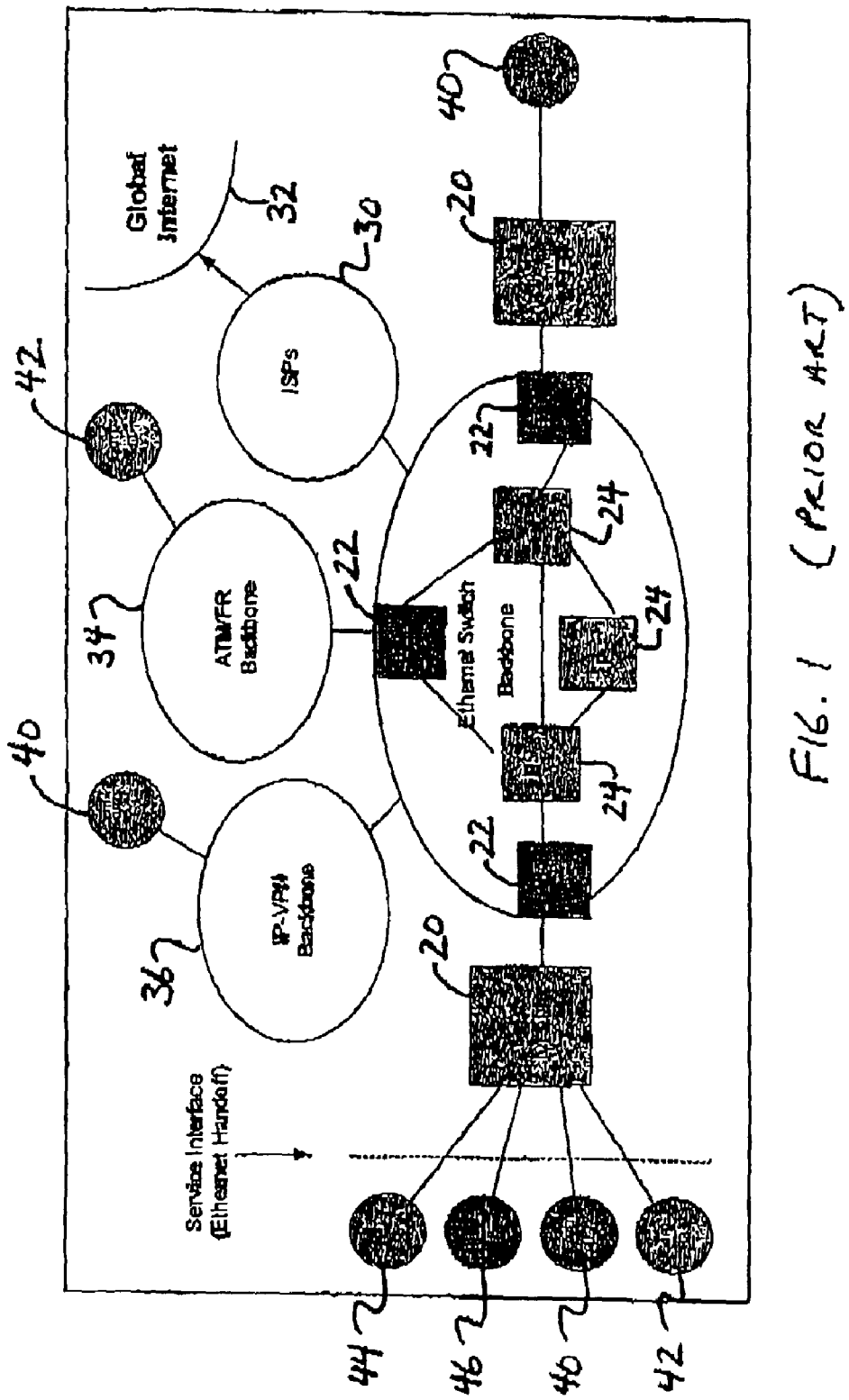
FIG. 1 is a block diagram of an Ethernet Optical Network (EON)

Abbreviations used in this patent disclosure are summarized as follows.

ATM: Asynchronous Transfer Mode
BGP: Border Gateway Protocol
BUF: Broadcast and Unknown Frames
CE device: Customer Edge device
CoS: Class of Service
CPE: Customer Premises Equipment
DA: Destination Address
DTLS: Decoupled Transparent LAN Service
EoMPLS: Ethernet over MPLS
EON: Ethernet Optical Network
HVPLS: Hierarchical VPLS
IETF: Internet Engineering Task Force
IP: Internet Protocol
LAN: Local-Area Network
LDP: Label Distribution Protocol
LER: Label Edge Router
LPE: Logical Provider Edge
LSP: Label Switched Path
LSR: Label Switched Router
MAC: Media Access Control
MAN: Metropolitan Area Network
MTU: Multi-Tenant Unit
MP: Multi-protocol
MPLS: Multi-protocol Label Switching
OAM: Operations and Maintenance
OC: Optical Carrier
OSPF: Open Shortest Path First
P device: Provider core device
PE device: Provider Edge device
PTP: Point-to-point
PVS: Permanent Virtual Circuit
QoS: Quality of Service
RSVP: Resource Reservation Protocol
RSVP-TE: RSVP with Traffic Engineering capability
SA: Source Address
SONET: Synchronous Optical Network
STP: Spanning Tree Protocol
TLS: Transparent LAN Service
VC: Virtual Circuit
VPLS: Virtual Private LAN Service/Segment
VPN: Virtual Private Network An ideal, scaleable EON architecture has the following eight high-level attributes.

Attribute 1. MAC learning is performed in the MTUs, but not in the PEs. Since MAC learning is CPU intensive, and a single PE may serve many MTUs, a PE performing MAC learning may be rendered clogged by MAC address explosion.

Attribute 2. Fully-meshed tunnel LSPs only should be between the PEs and not the MTUs. Since the number of MTUs is much greater than the number of PEs, a large number of tunnel LSPs would be required to logically connect all MTUs.

Attribute 3. No fully-meshed VC-LSPs should be required between the customer sites. Generally, VC-LSP support per port is about 2 k in current platforms. For scaleability concerns, the demand for the number of VC-LSPs should not increase exponentially as the number of VPLSs and MTUs increase.

Attribute 4. PEs should replicate frames to other PEs, and MTUs should replicate frames to other MTUs. The number of replications will be smaller in the PEs than the MTUs.

Attribute 5. No fully-meshed targeted LDP sessions between the MTUs should exist. The number of targeted LDP sessions should be kept to a minimum since targeted LDP sessions are CPU intensive. An LDP session can exist between the MTU and PE.

Attribute 6. Ease of manageability and configuration should be considered. No need for tracking customer VLANs (e.g. true TLS).

Attribute 7. Ease of troubleshooting should be considered. For this reason, site-to-site granularity should be preserved.

Attribute 8. A minimum or otherwise low protocol stack in MTUs should exist (e.g. no use of OSPF-TE or RSVP-TE). As a result, the MTUs are kept simple and economical.

None of the three proposed EoMPLS solutions (DTLS, HVPLS or LPE) has all of the aforementioned eight attributes. DTLS does not have attributes 3 and 4, HVPLS does not have attributes 1 and 7, and LPE does not have attribute 7. A main concern of DTLS is replication in the MTUs. Main concerns of HVPLS include MAC learning in the PEs, and no site-to-site granularity. Main concerns of LPE include proprietary and complex states with data encapsulation.

Disclosed herein are embodiments of a proposed EoMPLS solution based on DTLS, HVPLS and LPE. The EoMPLS solution satisfies many of the aforementioned attributes, but compromises for conflicting attributes. Additionally, the EoMPLS solution uses a dedicated VPLS VC-LSP for MAC learning using broadcast and unknown frames. A source site identifier is added when encapsulating the broadcast and unknown frames to facilitate the MAC learning. The architecture does not preclude heterogeneous deployment of the proposed EoMPLS solution with end-to-end MPLS.

Figure 2:
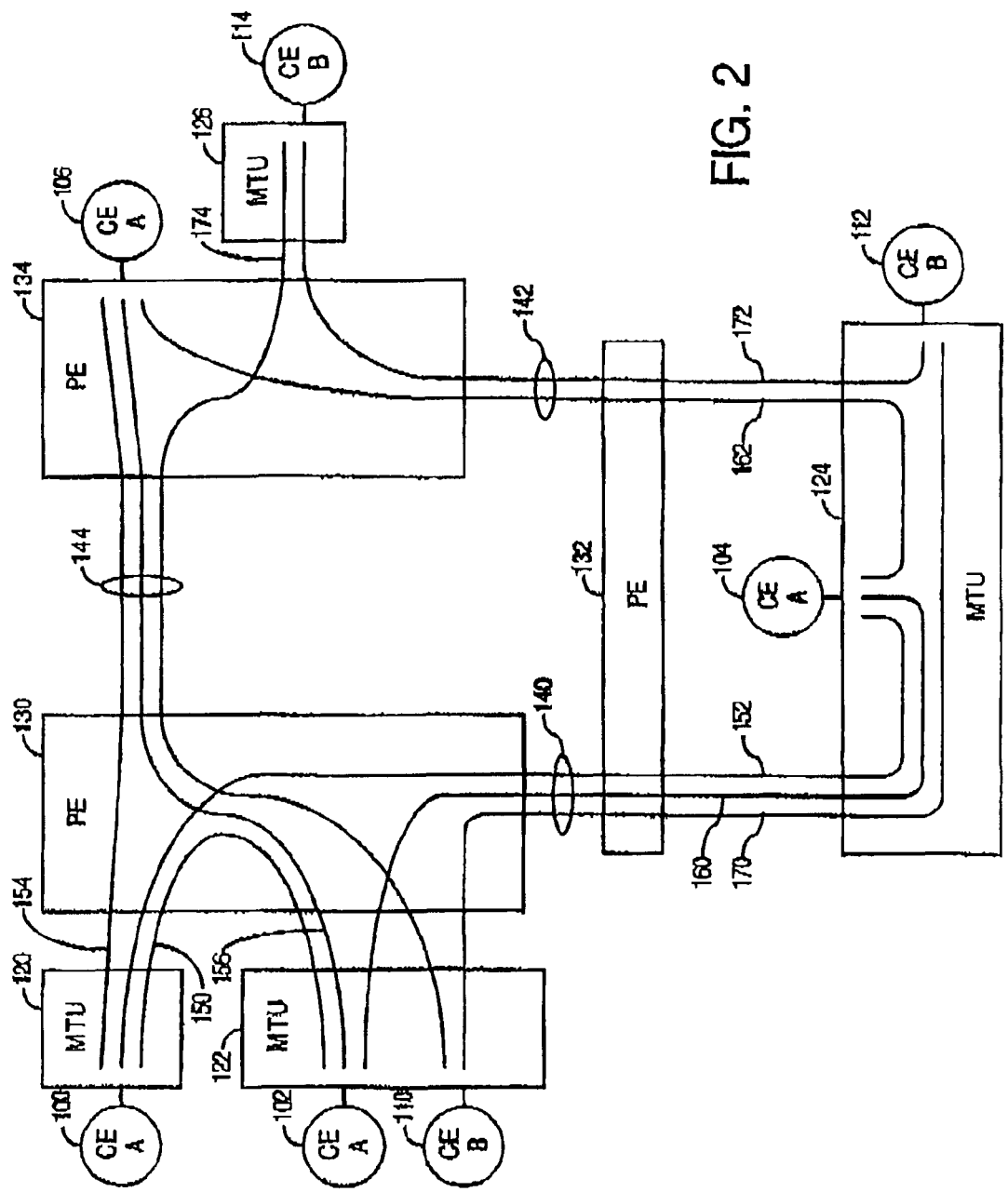
FIG. 2 is a block diagram of an embodiment of an EoMPLS system in accordance with the present invention.

FIG. 2 is a block diagram of an embodiment of an EoMPLS system in accordance with the present invention. For purposes of illustration and example, the EoMPLS system serves to provide a first VPLS to a first closed user group (also identified as closed user group A), and a second VPLS to a second closed user group (also identified as closed user group B). The first closed user group has CEs 100, 102, 104 and 106 at four different sites. The second closed user group has CEs 110, 112 and 114 at three different sites. Those having ordinary skill will appreciate that the EoMPLS system will typically serve more than two closed user groups, and that each closed user group can have a greater number of sites.

The EoMPLS system comprises MTUs 120, 122, 124 and 126. The CE 100 accesses the EoMPLS system via the MTU 120. The CEs 102 and 110 access the EoMPLS system via the MTU 122. The CEs 104 and 112 access the EoMPLS system via the MTU 124. The CE 114 accesses the EoMPLS system via the MTU 126.

The EoMPLS system comprises PE devices 130, 132 and 134. The PE device 130 serves the MTUs 120 and 122. The PE device 132 serves the MTU 124. The PE device 134 serves the MTU 126 and provides access to the EoMPLS system for the CE 106.

The PE devices 130, 132 and 134 are interconnected by a fully-meshed set of tunnel LSPs. In particular, the PE devices 130 and 132 communicate via a tunnel LSP 140, the PE devices 132 and 134 communicate via a tunnel LSP 142, the PE devices 134 and 130 communicate via a tunnel LSP 144. Having fully-meshed tunnel LSPs between the PE devices beneficially keeps the number of tunnel LSPs limited and scaleable in the core of the network.

For ease of troubleshooting, the MTUs 120, 122, 124 and 126 are fully-meshed by VC-LSPs for each closed user group. Thus, the EoMPLS system comprises VC-LSPs 150, 152, 154, 156, 160 and 162 associated with the first closed user group. The CEs 100 and 102 communicate via the VC-LSP 150. The CEs 100 and 104 communicate via the VC-LSP 152. The CEs 100 and 106 communicate via the VC-LSP 154. The CEs 102 and 106 communicate via the VC-LSP 156. The CEs 102 and 104 communicate via the VC-LSP 160. The CEs 104 and 106 communicate via the VC-LSP 162.

Similarly, the EoMPLS system comprises VC-LSPs 170, 172 and 174 associated with the second closed user group. The CEs 110 and 112 communicate via the VC-LSP 170. The CEs 112 and 114 communicate via the VC-LSP 172. The CEs 114 and 110 communicate via the VC-LSP 174.

The VC-LSPs 152, 160 and 170 are supported by the tunnel LSP 140. The VC-LSPs 162 and 172 are supported by the tunnel LSP 142. The VC-LSPs 154, 156 and 174 are supported by the tunnel LSP 144.

The feature of frame replication is performed by the PE devices 130, 132 and 134 to avoid an undesirably high number of replications required by the MTUs 120, 122, 124 and 126. For example, some customers may have 4000 or more sites that are part of the closed user group, in which case the MTU otherwise would have to replicate a broadcast frame 4000 or more times at line rate.

Another feature of the EoMPLS system is that MAC learning is performed by the MTUs 120, 122 and 124 and not by the PE devices 130, 132 and 134. This avoids MAC explosion and CPU-intensive MAC learning in the PEs. However, a PE device having a directly-connected CE (e.g. the PE device 134 having the CE 106 directly connected thereto) would also perform the herein-disclosed MAC learning acts. Alternatively, if a customer wants to pay extra for dual-homing, an MTU to which the customer connects can have PE functionality. The EoMPLS system performs auto-configuration and auto-discovery similar to DTLS or LPE.

Figure 3:
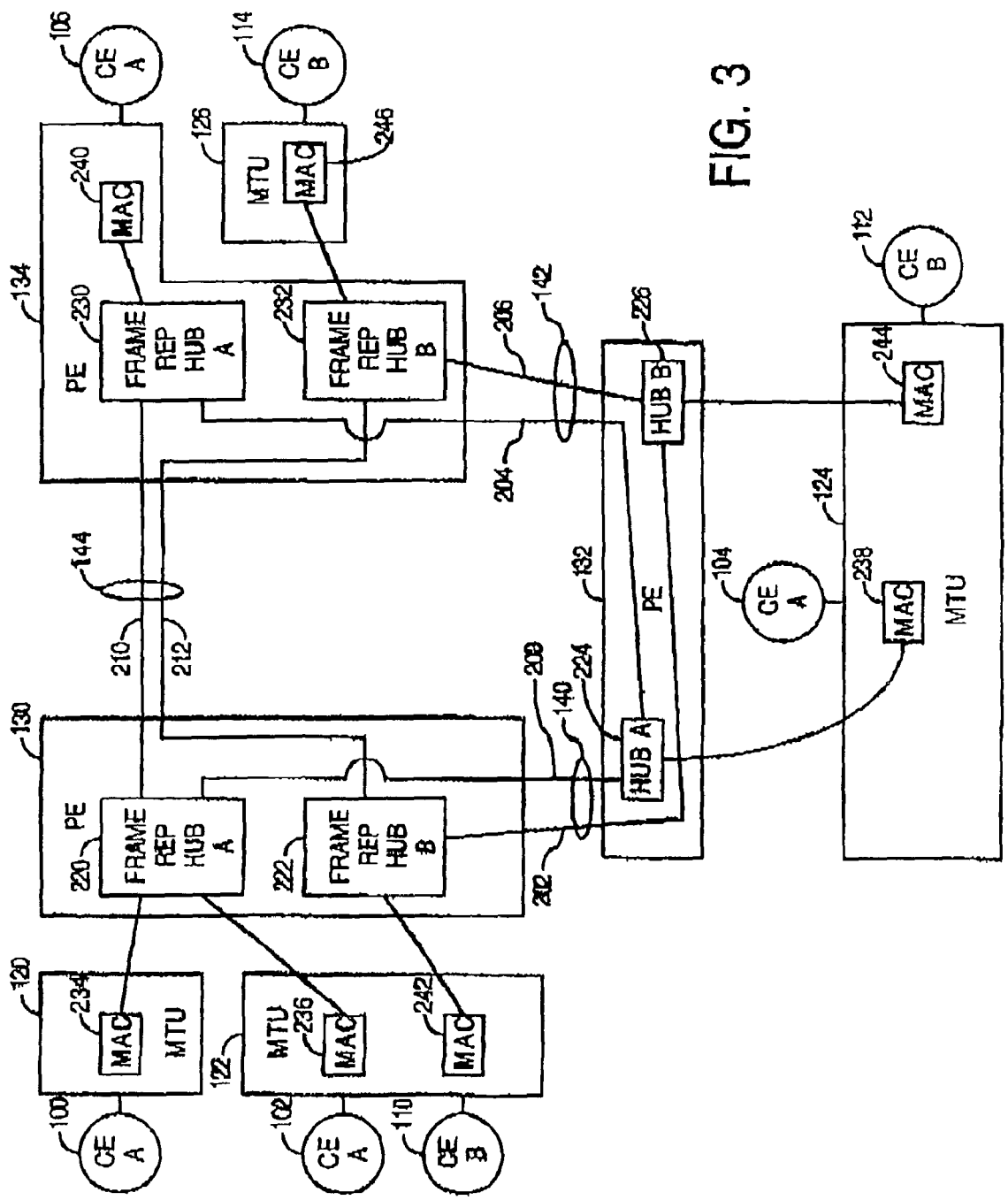
FIG. 3 illustrates how the EoMPLS system in FIG. 2 is adapted to do frame replication and MAC learning.

FIG. 3 illustrates how the EoMPLS system in FIG. 2 is adapted to do frame replication and MAC learning. MAC learning is accomplished using an additional VC-LSP for each VPLS for broadcast and unknown frames (herein denoted as a BUF-LSP for Broadcast and Unknown Frames LSP). Thus, the tunnel LSP 140 further supports a BUF-LSP 200 for the first VPLS and a BUF-LSP 202 for the second VPLS. The tunnel LSP 142 further supports a BUF-LSP 204 for the first VPLS and a BUF-LSP 206 for the second VPLS. The tunnel LSP 144 further supports a BUF-LSP 210 for the first VPLS and a BUF-LSP 212 for the second VPLS. If required or otherwise desired, the BUF-LSPs 200, 202, 204, 206, 210 and 212 can be rate-limited to protect the network against malicious customers.

The PE devices 130, 132 and 134 act as frame replication hubs in the system. Each of the PE devices 130, 132 and 134 provides a respective frame replication hub for each closed user group served thereby. Thus, the PE device 130 provides a frame, replication hub 220 for closed user group A and a frame replication hub 222 for closed user group B. Similarly, the PE device 132 provides a frame replication hub 224 for closed user group A and a frame replication hub 226 for closed user group B. Further, the PE device 134 provides a frame replication hub 230 for closed user group A and a frame replication hub 232 for closed user group B.

The frame replication hubs are fully-meshed by the BUF-LSPs. Thus, the frame replication hubs 220, 224 and 230 associated with closed user group A are fully-meshed by the BUF-LSPs 200, 204 and 210. Similarly, the frame replication hubs 222, 226 and 232 associated with closed user group B are fully-meshed by the BUF-LSPs 202, 206 and 212.

The MTUs 120, 122, 124 and 126 are spokes of the frame replication hubs. The hubs and spokes are directly connected by BUF-LSPs.

The frame replication hubs interact with other hubs and spokes as follows. A frame replication hub replicates frames coming from a spoke to other hubs and to directly connected spokes. A frame replication hub replicates frames coming from another hub to directly connected spokes. A frame replication hub does not send a copy of a frame coming from another hub to other hubs. The replicated frames include an encapsulated source site identifier as described hereinafter with reference to FIG. 4.

The EoMPLS system comprises a plurality of media access control (MAC) learning elements responsive to the BUF-LSPs to learn MAC addresses based on the encapsulated source site identifier. In particular, the EoMPLS system comprises MAC learning elements 234, 236, 238 and 240 to learn MAC addresses for closed user group A, and MAC learning elements 242, 244 and 246 to learn MAC addresses for closed user group B. The MAC learning elements 234, 236 and 238 are disposed at the MTUs 120, 122 and 124, respectively. The MAC learning elements 242, 244 and 246 are disposed at the MTUs 122, 124 and 126, respectively. The MAC learning element 240 is disposed at the PE device 134.

Figure 4:
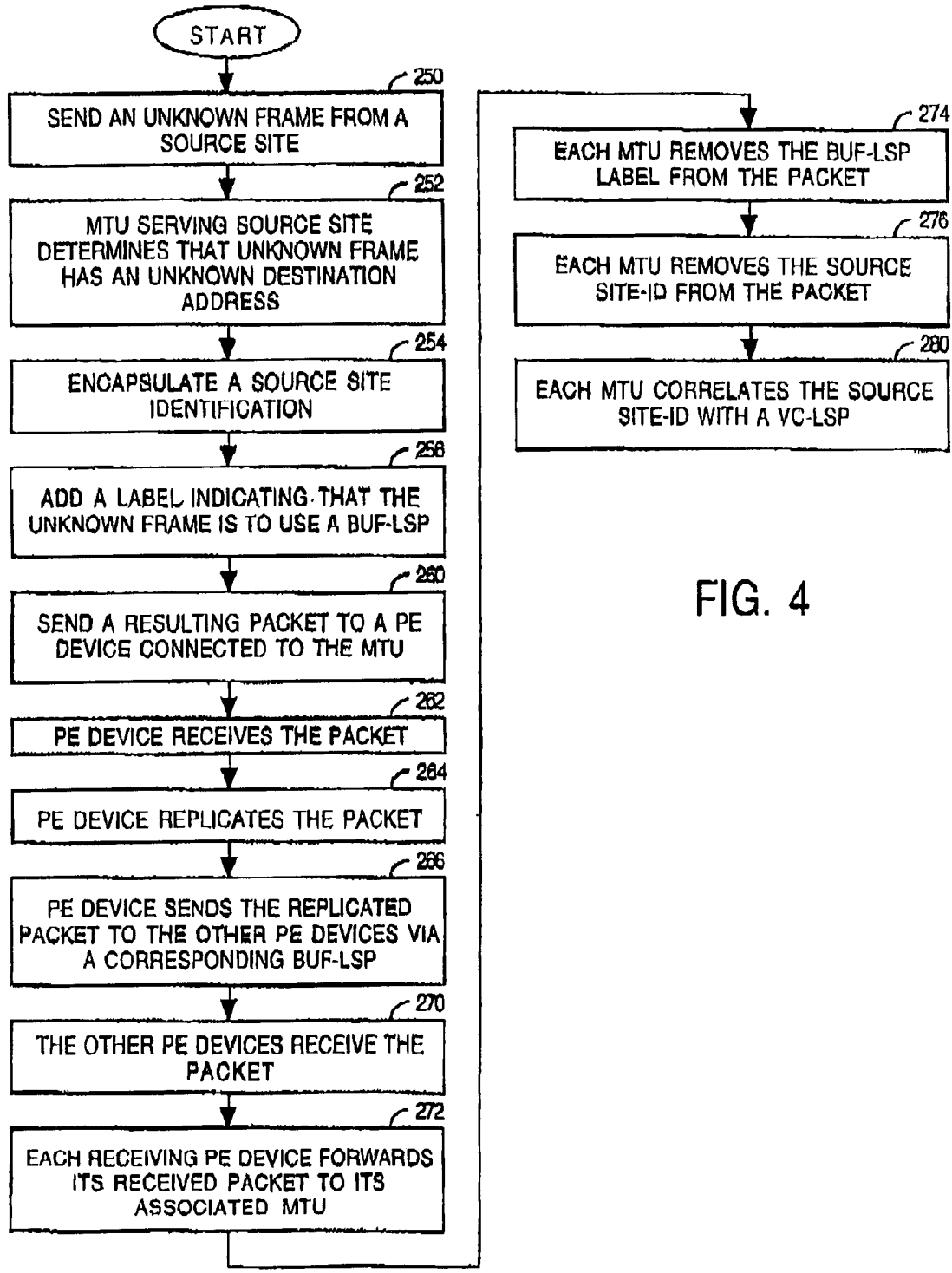
FIG. 4 is a flow chart of an embodiment of a method of MAC learning in the EoMPLS system.

FIG. 4 is a flow chart of an embodiment of a method of MAC learning in the EoMPLS system. The method is described with reference to one VPLS or closed user group provided by the EoMPLS system. Thus, in practice, the method of FIG. 4 is performed for each VPLS provided by the EoMPLS system. For purposes of illustration and example, the method will be described with reference to the second VPLS (i.e. for closed user group B) in FIG. 2. This VPLS has three sites (having the CE devices 110, 112 and 114), with each site being connected to a different MTU (the MTUs 122, 124 and 126, respectively), and each MTU being connected to a different PE device (the PE devices 130, 132 and 134, respectively).

As indicated by block 250, the method comprises sending an unknown frame from one of the sites, which is referred to as a source site. For purposes of illustration and example, consider the unknown frame being sent from a first site served by the MTU 122.

As indicated by block 252, an MTU serving the source site determines that the unknown frame has an unknown destination address (DA). In response thereto, the MTU encapsulates or otherwise adds a site identification (site-ID) for the source site (block 254), pushes or otherwise adds a label indicating that the unknown frame is to be communicated on a BUF-LSP (block 256), and sends a resulting MPLS packet to the PE device connected to the MTU (block 260). Keeping with the example, the MTU 122 would determine that the frame has an unknown destination address, and in response thereto, would add a site-ID for the first site, push a label indicating that the unknown frame is to be communicated on a BUF-LSP, and send a resulting MPLS packet to the PE device 130.

The source site-id may be encapsulated in an unknown frame in a variety of ways. In one embodiment, the encapsulated source site-id for an unknown frame is included in an Ethernet control word. The Martini specifications define an optional control word for Ethernet that may be used for this purpose. As presently believed, vendors have not implemented the control word for Ethernet. Thus, the vendors may be asked to include the control word for Ethernet, and the site-id can be carried in the control word by a new definition. In another embodiment, the encapsulated source site-id for an unknown frame is included in a Multi-protocol Label Switching (MPLS) label. This embodiment may require adjustment in MPLS implementation in the MTUs.

As indicated by block 262, the PE device receives the MPLS packet from the MTU. The PE device replicates the MPLS packet (block 264), and sends a copy to each of the other PE devices via a corresponding BUF-LSP (block 266). Continuing with the above example, the PE device 130 receives the MPLS packet from the MTU 122, replicates the MPLS packet, sends one copy of the MPLS packet to the PE device 132 via the BUF-LSP 202, and sends another copy of the MPLS packet to the PE device 134 via the BUF-LSP 212.

As indicated by block 270, the PE devices receive the MPLS packets sent thereto. Each receiving PE device forwards its received packet to its associated MTUs (block 272). Continuing with the above example, the PE device 132 receives its MPLS packet and forwards same to the MTU 124, and the PE device 134 receives its MPLS packet and forwards same to the MTU 126.

As indicated by blocks 274 and 276, the MTU pops or otherwise removes the BUF-LSP label from the MPLS packet, and removes the source site-ID from the MPLS packet. The MTU correlates the source site-ID with a VC-LSP and thereby learns the source address (block 280). Continuing with the example, the MTU 124 correlates the source address with the VC-LSP 170 and the MTU 126 correlates the source address with the VC-LSP 174. Thereafter, for frames destined to the source address, the MTU 124 uses the VC-LSP 170, and the MTU 126 uses the VC-LSP 174. When the MTU 122 receives frames destined for the source address from the VC-LSP 170, the MTU 122 learns that frames destined for the site associated with the MTU 124 are to be communicated using the VC-LSP 170. Similarly, when the MTU 122 receives frames destined to the source address from the VC-LSP 174, the MTU 122 learns that frames destined to the site associated with the MTU 126 are to be communicated using the VC-LSP 174. It is noted that no encapsulation changes are used for frames sent through the site-to-site VC-LSPs 150, 152, 154, 156, 160, 162, 170, 172 and 174.

It is noted that the MAC-learning acts depicted in FIG. 4 may be performed either concurrently or in an alternative order. For example, not all of the MTUs need to perform the act in block 274 before some of the MTUs proceed to blocks 276 and 280.

The acts described herein may be directed by computer program code stored by a computer-readable medium. Examples of the computer-readable medium include, but are not limited to, an optical medium such as an optical disk, an electronic medium such as an electronic memory, and a magnetic medium such as a hard disk. Each MTU comprises a processor responsive to computer program code to perform the MTU-related acts. Each PE devices comprises a processor responsive to computer program code to perform the PE-related acts.

It will be apparent to those skilled in the art that the disclosed inventions may be modified in numerous ways and may assume many embodiments other than the preferred forms specifically set out and described herein.

Accordingly, it is intended by the appended claims to cover all modifications which fall within the true spirit and scope of the present invention.

What is claimed is:

1. A telecommunication system comprising:
   a virtual private local area network service (VPLS) comprising a plurality of provider edge (PE) devices configured to replicate frames associated with a first closed user group of a plurality of closed user groups;
   a first plurality of virtual circuit label switched paths (VC-LSPs) dedicated to communicate broadcast and unknown frames within the first closed user group; and
   a first multi-tenant unit (MTU) of a plurality of multi-tenant units (MTUs), wherein each MTU of the plurality of MTUs is directly connected to a PE device of the plurality of PE devices, wherein each MTU of the plurality of MTUs is configured to form a multi-protocol label switching (MPLS) packet including a frame, a broadcast and unknown frame (BUF) label, and an encapsulated source site identifier when the MTU receives the frame from a source served by the MTU and the frame has an unknown destination address, wherein the first MTU includes a first media access control (MAC) learning element responsive to the first plurality of VC-LSPs to learn MAC addresses based on encapsulated source site identifiers, wherein the MTUs are fully meshed by respective VC-LSPs for each closed user group, and wherein the first MTU removes a BUF label and an encapsulated source site identifier from a MPLS packet formed by a different MTU and received via the PE device directly coupled to the first MTU.

2. The telecommunication system of claim 1, wherein the encapsulated source site identifier is included in a Multi-protocol Label Switching (MPLS) label.

3. The telecommunication system of claim 1, further comprising:
   a plurality of frame replication hubs; and
   a plurality of spoke elements associated with a plurality of sites, each of the spoke elements directly connected to one of the frame replication hubs by one of the first plurality of VC-LSPs.

4. The telecommunication system of claim 3, wherein each frame replication hub of the plurality of frame replication hubs is to replicate frames received from a directly-connected spoke element to others of the plurality of frame replication hubs and to other directly-connected spoke elements.

5. The telecommunication system of claim 3, wherein each frame replication hub is to replicate frames received from others of the plurality of frame replication hubs to its directly-connected spoke elements.

6. The telecommunication system of claim 3, wherein each of the frame replication hubs is disposed at a respective one of the plurality of PE devices.

7. The telecommunication system of claim 6, wherein each of the spoke elements is disposed at a respective one of the plurality of multi-tenant units (MTUs).

8. The telecommunication system of claim 6, wherein the plurality of PE devices is fully meshed by a plurality of tunnel label switched paths (LSPs).

9. A telecommunication system comprising:
a virtual private local area network service (VPLS) to replicate frames associated with a first closed user group of a plurality of closed user groups, wherein the first closed user group includes a plurality of customer premises equipment devices;
a plurality of provider edge (PE) devices each having a frame replication hub to replicate unknown frames associated with the VPLS;
a first plurality of virtual circuit label switched paths (VC-LSPs) dedicated to communicate broadcast and unknown frames between pairs of the customer premises equipment devices in the first closed user group;
a second plurality of VC-LSPs to communicate data for the first closed user group, wherein the PE devices are fully meshed by the second plurality of VC-LSPs; and
a plurality of multi-tenant units (MTUs) each directly connected to a respective one of the PE devices, wherein each of the MTUs is configured to form a multi-protocol label switching (MPLS) packet including an unknown frame, a broadcast and unknown frame (BUF) label, and an encapsulated source site identifier when the MTU receives the unknown frame from a source served by the MTU and the unknown frame has an unknown destination address, wherein each of the MTUs has a respective media access control (MAC) learning element to learn MAC addresses for the first closed user group based on encapsulated source site identifiers of MPLS packets, wherein the MTUs are fully meshed by respective VC-LSPs for each closed user group and wherein at least one of the MTUs removes a BUF label and an encapsulated source site identifier from a MPLS packet formed by a different MTU and received via the PE device directly connected to the at least one of the MTUs.

10. The telecommunication system of claim 9, wherein the encapsulated source site identifier is included in a Multi-protocol Label Switching (MPLS) label.

11. The telecommunication system of claim 9, wherein each frame replication hub is to replicate frames received from a directly-connected PE device to others of the frame replication hubs and to other directly-connected PE devices, and wherein each frame replication hub is to replicate frames received from others of the frame replication hubs to its directly-connected PE devices.

12. A system comprising:
a virtual private local area network service (VPLS) to replicate frames associated with a first closed user group of a plurality of closed user groups;
a plurality of provider edge (PE) devices communicatively coupled via a respective plurality of tunnel label switched paths (LSPs);
a plurality of multi-tenant units (MTUs), wherein each of the plurality of MTUs is coupled to a respective one of the plurality of PE devices, wherein the MTUs of the plurality of MTUs are communicatively coupled via a respective plurality of virtual circuit label switched paths (VC-LSPs) that are supported by the respective plurality of tunnel LSPs, wherein each of the plurality of MTUs is configured to form a multi-protocol label switching (MPLS) packet including an unknown frame, a broadcast and unknown frame (BUF) label, and an encapsulated source site identifier when the MTU receives the unknown frame from a source served by the MTU and the unknown frame has an unknown destination address, wherein the MTUs are fully meshed by respective VC-LSPs for each closed user group, wherein each of the plurality of MTUs includes a respective media access control (MAC) learning element to learn MAC addresses associated with the VPLS based on an encapsulated source site identifier in a MPLS packet formed by another MTU associated with the first closed user group; and
wherein a first MTU of the plurality of MTUs is adapted to host a first plurality of VC-LSPs dedicated to communicate broadcast and unknown frames for the first closed user group between pairs of PE devices of the plurality of PE devices and wherein the first MTU removes a BUF label and an encapsulated source site identifier from a MPLS packet formed by a different MTU and received via the PE device coupled to the first MTU.

13. The system of claim 12, wherein each PE device of the plurality of PE devices is adapted to replicate frames received from at least one MTU or from one or more of the plurality of PE devices.

14. A system comprising:
a virtual private local area network service (VPLS) comprising a plurality of provider edge (PE) devices communicatively coupled via a respective plurality of tunnel label switched paths (LSPs), and wherein each PE device has a frame replication hub to replicate unknown frames associated with a first closed user group of a plurality of closed user groups;
a first plurality of virtual circuit label switched paths (VC-LSPs) dedicated to communicate broadcast and unknown frames between pairs of customer premises equipment devices in the first closed user group;
a second plurality of VC-LSPs dedicated to communicate data between pairs of PE devices; and
a plurality of multi-tenant units (MTUs), wherein each of the MTUs is directly connected to a respective one of the PE devices and at least one customer premises equipment device, wherein each of the plurality of MTUs is configured to form a multi-protocol label switching (MPLS) packet including an unknown frame, a broadcast and unknown frame (BUF) label, and an encapsulated source site identifier when the MTU receives the frame from a customer premises equipment device served by the MTU and the frame has an unknown destination address, wherein each of the MTUs has a respective media access control (MAC) learning element to learn MAC addresses for the first closed user group based on the encapsulated source site identifier, wherein the MTUs are fully meshed by respective VC-LSPs for each closed user group and wherein at least one of the MTUs removes a BUF label and an encapsulated source site identifier from a MPLS packet formed by a different MTU and received via the PE device directly connected to the at least one of the MTUs.

15. The system of claim 14, wherein the encapsulated source site identifier is included in a Multi-protocol Label Switching (MPLS) label.

16. The system of claim 14, wherein the encapsulated source site identifier is included in a control word.

17. The system of claim 14, wherein a particular MTU that forms a particular MPLS packet sends the particular MPLS packet to the PE device directly connected to the particular MTU, wherein the PE device replicates the MPLS packet, and wherein the PE device sends replicated packets to other PE devices associated with the first closed user group.

18. The system of claim 17, wherein the other PE devices forward the received replicated packet to MTUs served by the other PE devices and associated with the first closed user group.

\* \* \* \* \*

UNITED STATES PATENT AND TRADEMARK OFFICE
CERTIFICATE OF CORRECTION

PATENT NO. : 7,813,345 B2  Page 1 of 1
APPLICATION NO. : 10/455745
DATED : October 12, 2010
INVENTOR(S) : Yetfk Serbest et al.

It is certified that error appears in the above-identified patent and that said Letters Patent is hereby corrected as shown below:

Title Page, Item (57), in the Abstract, Line 3 "The known frames have an encapsulated source site identifier used for media access control (MAC) address learning" should read --The unknown frames have an encapsulated source site identifier used for media access control (MAC) address learning--.

Signed and Sealed this
Twenty-fifth Day of January, 2011

David J. Kappos
*Director of the United States Patent and Trademark Office*